Dec. 20, 1966     A. HOROWITZ     3,292,457
PLANETARY SYSTEM FOR USE WITH HYDRAULIC DEVICES
Filed March 11, 1964
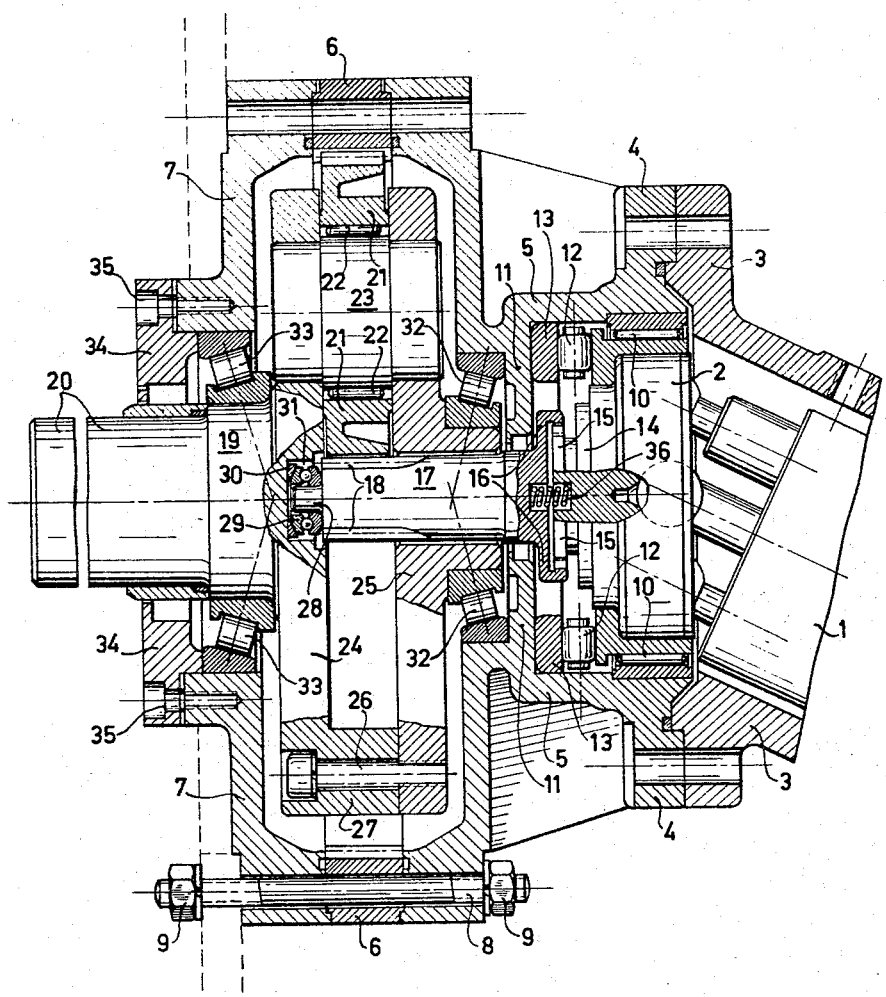
INVENTOR.
ALEXANDRE HOROWITZ
BY
*Semmes and Semmes*
ATTORNEYS United States Patent Office 3,292,457
Patented Dec. 20, 1966

3,292,457
PLANETARY SYSTEM FOR USE WITH
HYDRAULIC DEVICES
Alexandre Horowitz, Pelikaanlaan 10,
Eindhoven, Netherlands
Filed Mar. 11, 1964, Ser. No. 351,093
Claims priority, application Netherlands, Mar. 14, 1963,
290,198
6 Claims. (Cl. 74—730)

My invention relates to a combination, consisting of two elements, viz a fast running hydraulic device, such as a motor or pump and a toothed gear with a shaft connected to said device, said shaft being either driving or driven, which elements are accommodated in a common housing, the number of revolutions of the hydraulic device being considerably greater than that of said shaft.

In such a combination difficulties are sometimes experienced in that the dimensions of the fast running hydraulic device are always chosen as small as possible, whilst the dimensions of the rotatingly driven implement (in the case of an hydraulic motor) or of the driving power source (in the case of an hydraulic pump) are also mostly small, whereas the toothed gear, interposed between the said two elements, causes a considerable enlargement of the overall dimensions of the complete combination. This enlargement is also due to the required torsionally stiff coupling between the above mentioned two elements.

Attempts have been made to remedy this by employing an hydraulic motor, running at a smaller number of revolutions, whereby it is possible to couple the hydraulic motor directly to the implement to be rotated. However this results in hydraulic motors of greater dimensions, the dimensions of the entire combination still remaining very considerable in this case. A slowly running motor has moreover further inherent disadvantages as compared with a fast running hydraulic motor.

It is an object of my invention to provide a planetary system in which the just mentioned disadvantages are obviated and the resulting combination representing a very smooth running combination of limited dimensions.

It is a further object of my invention to provide a compact system which can serve as a power source for applying a substantial torque at a low number or revolutions or as an implement for supplying pressure fluid.

The invention will further be clarified with reference to the accompanying drawing in which a longitudinal section through the axis of an embodiment of the aggregate combination according to the invention is represented.

A first running hydraulic motor 1, with axial cylinders which is only partially represented, drives in the depicted embodiment a disc 2. Hydraulic motors having another type of driven element can of course also be used. The hydraulic motor 1 is coupled through a flange 3 to a complementary outer flange 4 of a casing, consisting of three parts 5, 6 and 7. On the outer circumference these three parts 5, 6 and 7 are coupled to one another by means of bolts 8 and locking nuts 9. In the depicted embodiment the driven disc 2 of the hydraulic motor 1 is supported by means of a needle roller bearing 10 in the casing part 5 so as to be rotatable about its own axis. Between the back side of the driven disc 2 and the inner wall of an inner flange 11 of the casing part 5 a thrust roller bearing 12, 13 is provided.

The hydraulic motor 1 has an output member 14 the diameter of which is stepwise reduced. On its free end said member 14 carries a coupling disc 15 with an outer toothing, cooperating with a complementary inner toothing formed on a coupling disc 16, provided on the free end of a coupling axle 17. Hereby a completely flexible connection is obtained both with the driven disc 2 of the hydraulic motor 1 and the central shaft portion of the gear, the complementary toothings of the coupling discs 15 and 16 allowing for a minor angle deviation, without giving rise to a clearance in rotational sense. It should be noted that obviously the inner toothing could also be provided on the coupling disc of the output member, while the outer toothing in that case should be provided on the coupling disc of the central shaft portion.

The coupling axle 17 is on its end remote from the coupling disc 16 provided with a toothing 18, constituting the central sun wheel for a planetary system, which forms the reduction mechanism in the transmission between the driven disc 2 and the driven end 19 of an output shaft 20. This planetary system has in the embodiment represented three statellites, one satellite 21 of which is directly visible in section in the drawing. This satellite 21, like the two other satellites, is situated so as to be rotatable around a shaft 23 by means of a needle roller bearing 22, the said shaft being on either side fixedly mounte in two discs 24 and 25 constituting a satellite bearer. The two discs 24 and 25 are clamped together on their outer circumference by means of screw bolts 26. Each bolt 26 extends through a thickened part 27, being integral with the disc 24, these parts warranting also the correct spacing of the two discs 24 and 25. The casing part 6 is on its inner side provided with teeth, which constitute the fixed annular or outer sun wheel of the planetary system.

The end of the coupling axle 17 turned towards the driven end 19 of the output shaft 20 is rotatably supported by a gudgeon 28 in a ball bearing 29, while the other ring of this ball bearing is bearing against a spherical supporting ring 30. This supporting ring 30 itself is bearing against the bottom of a recess 31 provided in the disc 24. This recess 31 at the location, where the disc 24 on its outer side merges into the driven end 19 of the shaft 20, is centrically disposed in respect of the axis of the coupling axle 17. The discs 24 and 25 and the output axle 20 are rotatably supported in the casing, formed by the parts 5, 6 and 7, through the intermediary of two inclined thrust roller bearings 32, 33 respectively. The output side of the casing part 7 is on behalf of the shaft 20 closed by a saucer 34, which with the aid of screw bolts 35 is secured on the casing part 7. Provided between the coupling discs 15 and 16 is a compression spring 36 in order to avoid a longitudinal clearance in the bearing 29, 30.

The means by which a torsionally stiff and still flexible coupling is obtained between the hydraulic device on the one side and the toothed gearing on the other side consist in this case of the spherically formed supporting ring 30 and the meshing toothings of the discs 15 and 16. Within the scope of the invention are, however, constructions in which not the end of the coupling axle 17 is bearing on a spherical supporting ring, but in which for instance the satellite bearer 24–27 has a certain self-adjustability.

It is a special object of my invention to provide means for enabling a fast running hydraulic motor with a speed of e.g. 1500–2000 revolutions per minute to be used in combination with a reduction gear, achieving a reduction in the ratio of 1:5 to 1:10, so that the output shaft 20 (see the drawing) can produce a low number of revolutions with a high torque.

Various kinds of hydraulic motors can be applied, like those with axial or radial cylinders or those provided with gear wheels. A preferred application can be found aboard ships, an hydraulic motor being applied with a rotational speed of about 250 revolutions a minute, the output shaft obtaining a velocity of rotation of 50 revolutions a minute, for driving winches and capstans. A same combination can be applied for making a crane perform a slewing motion.

The invention disclosed herein can also be used in conjunction with an hydraulic pump and driving gear, which aggregate by way of the shaft 20 is driven at a definite number of revolutions, an acceleration being imparted to the hydraulic pump. Especially in the event of fast running screw pumps, which can be driven at a speed of 2000–5000 revolutions per minute, the aggregate combination according to my invention is very useful.

What I claim is:
1. A self-aligning device to couple an hydraulic prime mover to a reduction gearing mechanism, which comprises:
  (A) an hydraulic prime mover;
  (B) a reduction gearing mechanism with an output shaft;
  (C) a first coupling disc drivably connected to said prime mover, and having an outer toothing;
  (D) a coupling axle, one end drivingly connected to a reduction gearing mechanism and said end being journalled in a pivotal bearing supported in said gear mechanism, said coupling axle comprising on the other end thereof a second coupling disc defining an interior toothing complementary to said outer toothing and engaged therewith, said first and second coupling discs correcting for angle deviation between the hydraulic motor and the reduction gearing mechanism, and providing a direct self-aligning coupling therebetween.

2. The device as described in claim 1, which further comprises:
  (E) a compression spring secured between said first and second coupling discs to prevent clearance in said bearing means.

3. The device as described in claim 1, which further comprises:
  (E) an housing enclosing said prime mover and said reduction gearing mechanism, said shaft extending through a hole defined by said housing.

4. A device as described in claim 1, wherein the reduction gearing mechanism comprises a planetary system, said one end of said coupling axle defining the teeth of the central sun wheel.

5. The device as described in claim 1, wherein said hydraulic prime mover is an axial plunger type comprising a rotatable disc mounted thereon, said disc being connected to said first coupling disc and supported in the housing by means of a radial needle bearing and a thrust bearing.

6. The prime mover-driven shaft as described in claim 5, wherein said radial needle bearing and said thrust bearing comprise a single ring having an L-shaped cross-section.

References Cited by the Examiner
UNITED STATES PATENTS

| | | | |
|---|---|---|---|
| 2,173,855 | 9/1939 | Orshansky | 74—687 |
| 2,583,140 | 1/1952 | Else | 74—801 |
| 2,645,298 | 7/1953 | Hawkins et al. | |
| 2,698,013 | 12/1954 | Brill et al. | 74—411 X |
| 2,759,376 | 8/1956 | Chamberlin et al. | 74—801 |
| 2,802,377 | 8/1957 | Berthiez | 74—411 X |
| 2,853,893 | 9/1958 | Magnuson | 74—411 |
| 2,891,419 | 6/1959 | Badalini | 74—687 |
| 3,021,731 | 2/1962 | Stoeckicht | 74—801 |
| 3,213,713 | 9/1965 | Sagare | 74—410 X |
| 3,218,889 | 11/1965 | Jarchow | 74—410 X |

DAVID J. WILLIAMOWSKY, *Primary Examiner.*

J. R. BENEFIEL, *Assistant Examiner.*